(12) United States Patent
Yang et al.

(10) Patent No.: US 8,050,453 B2
(45) Date of Patent: Nov. 1, 2011

(54) ROBUST OBJECT TRACKING SYSTEM

(75) Inventors: Ming Yang, Evanston, IL (US); Ying Wu, Evanston, IL (US); Shengyang Dai, Evanston, IL (US); Shihong Lao, Kyoto (JP)

(73) Assignees: OMRON Corporation, Kyoto (JP); Northwestern University, Evanston, IL (US)

(*) Notice: Subject to any disclaimer, the term of this patent is extended or adjusted under 35 U.S.C. 154(b) by 1539 days.

(21) Appl. No.: 11/453,549

(22) Filed: Jun. 15, 2006

(65) Prior Publication Data

US 2007/0291984 A1 Dec. 20, 2007

(51) Int. Cl.
*G06K 9/00* (2006.01)
(52) U.S. Cl. ......... 382/103; 382/100; 382/190; 382/236
(58) Field of Classification Search .................. 382/100, 382/103, 190, 236, 305; 348/169
See application file for complete search history.

(56) References Cited

U.S. PATENT DOCUMENTS

| 6,363,160 | B1* | 3/2002 | Bradski et al. ................. 382/103 |
| 7,715,961 | B1* | 5/2010 | Kargupta ......................... 701/33 |
| 2003/0085840 | A1* | 5/2003 | Benner et al. ................. 342/450 |
| 2006/0028552 | A1* | 2/2006 | Aggarwal et al. ............. 348/169 |
| 2006/0187305 | A1* | 8/2006 | Trivedi et al. ................. 348/169 |

OTHER PUBLICATIONS

P. Viola and M. Jones; "Rapid Object Detection Using a Boosted Cascade of Simple Features"; In CVPR '01; vol. 1, pp. 511-518, Hawaii, Dec. 2001 (8 pages).
R. Agrawal and R. Srikant, "Fast Algorithms for Mining Association Rules"; In VLDB '94, pp. 487-499, Chile, 1994 (13 pages).
S. Avidan; "Support vector tracking"; IEEE Transactions on Pattern Analysis and Machine Intelligence; vol. 26, No. 8, Aug. 2004 (9 pages).
S. Avidan; Ensemble tracking; In CVPR '05, vol. 2, San Diego, CA; Jun. 2005 (8 pages).
S. Birchfield; "Elliptical Head Tracking Using Intensity Gradients and Color Histograms"; In CVPR '98, Santa Barbara, CA; Jun. 1998 (6 pages).
M. J. Black and A.D. Jepson; "EigenTracking: Robust Matching and Tracking of Articulated Objects Using a View-Based Representation"; In ECCV '96, Cambridge, England; Apr. 1996 (14 pages).
R.T. Collins and Y. Liu; "On-Line Selection of Discriminative Tracking Features"; In ICCV '03; vol. 2, Nice, France; Oct. 2003 (7 pages).
D. Comaniciu, V. Ramesh and P. Meer; "Real-Time Tracking of Non-Rigid Objects using Mean Shift"; In CVPR '00, vol. 2, Hilton Head Island, SC; Jun. 2000 (8 pages).
A. Fitzgibbon and A. Zisserman; "On Affine Invariant Clustering and Automatic Cast Listing in Movies"; In ECCV '02; vol. 3, The University of Oxford; 2002 (17 pages).
G. Grahne and J. Zhu; Fast Algorithms for Frequent Itemset Mining Using FP-Trees; IEEE Trans. Knowledge Data Eng.; vol. 17, No. 10; Oct. 2005 (17 pages).
G. Hager and P. Belhumeur; Real-Time Tracking of Image Regions with Changes in Geometry and Illumination; In CVPR '96, San Francisco, CA; Jun. 1996 (8 pages).
G. Hua and Y. Wu; "Measurement Integration under inconsistency for robust tracking"; In CVPR '06, Northwestern University; Jun. 2006 (8 pages).

(Continued)

*Primary Examiner* — Brian Q Le
*Assistant Examiner* — Ali Bayat
(74) *Attorney, Agent, or Firm* — Osha• Liang LLP

(57) ABSTRACT

A method for tracking objects includes identifying a target, identifying a plurality of auxiliary objects related to the target, and tracking the target using the plurality of auxiliary objects.

8 Claims, 9 Drawing Sheets

OTHER PUBLICATIONS

M. Isard and A. Blake; "Contour Tracking by stochastic propagation of conditional density"; In ECCCV '96; University of Oxford, UK; 1996 (14 page).

R. Jain, R. Kasturi, B. Schunck; "Machine Vision"; McGraw Hill, Inc.; 1995 (5 pages).

K.-C. Lee and D. Kriegman; "Online Learning of Probabilistic Appearance Manifolds for Video=based Recognition and Tracking"; In CVPR '05, vol. 1, 2005 IEEE (16 page).

M. Leordeanu and R. Collins; "Unsupervised Learning of Object Features from Video Sequences"; In CPR '05, vol. 1; San Diego, CA, Jun. 2005 (8 pages).

J. Lim, D. Ross, R-S. Lin and M-H Yang; "Incremental Learning for Visual Tracking"; In NIPS '04, Vancouver, Canada; Dec. 2004 (8 pages).

D. Lowe; "Object Recognition from Local Scale-Invariant Features"; In ICCV '99; Vancouver, B.C., Canada; Sep. 1999 (8 pages).

K. Mikolajczyk and C. Schmid; "Indexing based on scale invariant interest points"; In ICCV '01, vol. 1; Vancouver, Canada; Jul. 2001 (7 pages).

J. Sivic and A. Zisserman; "Video Google: A Text Retrieval Approach to Object Matching in Videos"; In ICCV '03, vol. 2, Nice, France; Oct. 2003 (8 pages).

J. Sivic and A. Zisserman; "Video Data Mining Using Configurations of Viewpoint Invariant Regions"; In CVPR '04, vol. 1; Washington, DC; Jun.-Jul. 2004 (8 pages).

J. Wang, Z. Chen and W. Gao; "Online Selecting Discriminative Tracking Features Using Particle Filter"; In CVPR '05; vol. 2; San Diego, CA; Jun. 2005 (6 pages).

M. Yang and Y. Wu; "Tracking Non-stationary Appearances and Dynamic Feature Selection"; In CVPR '05, vol. 2, San Diego, CA; Jun. 2005 (8 pages).

T. Yu and Y. Wu; "Collaborative Tracking of Multiple Targets"; In CVPR '04; vol. 1; Washington, DC; Jun.-Jul. 2004 (8 pages).

* cited by examiner

ROBUST OBJECT TRACKING SYSTEM

BACKGROUND

Real-time tracking of moving objects has many practical applications, including use in surveillance and monitoring, air traffic control, sporting events, human-computer interaction, smart rooms, and video compression. However, current tracking algorithms continue to have difficulty with efficient and robust real-time tracking of objects in complex environments. Challenges in real-world target tracking include tracking single and multiple targets in complex environments with multiple objects and clutter; tracking agile targets with unpredictable directions and speeds; and environmental influences such as illumination and view changes, occlusions, low image quality, and motion blur.

Current observation models for visual tracking can be separated into two classes; tracking likelihood models (TLMs) or verification likelihood models (VLMs). TLMs generally classify objects using simple image features, such as contours, color histograms, or image templates. As a result, TLMs are simple and efficient, but cannot handle complex changes in the appearance of the target. VLMs tend to use classifiers that differentiate the true target from false positives, and therefore need to extract and store features such as invariants of the target or variations of the target's appearance. VLMs are computationally demanding and difficult to model, but capable of more accurately recognizing the target. In addition, supervised learning is often required to adapt a VLM to the variabilities of a particular target.

Techniques used for target tracking include artificial neural networks, Bayesian methods, and mean-shift tracking. Artificial neural networks are interconnected groups of artificial neurons; the connections and weights between neurons in an artificial neural network determine the outputs, given a set of inputs. Artificial neural networks can be trained to identify the features of a target and track it in a sequence of images.

Bayesian methods use evidence or observations to update or newly infer the probability that a hypothesis is true. Hypotheses with a high degree of belief, or probability, are accepted as true, while hypotheses with a low degree of belief are rejected as false. Bayesian methods can be used to identify a target by extracting information about the surroundings as well as properties of the target in previous frames.

Mean-shift tracking involves minimizing the statistical distance between two distributions. The target is initially characterized with a probability distribution related to an attribute, such as color, texture, or image gradient. In subsequent frames, the target is tracked by minimizing the statistical distance between the characterized probability distribution and the distribution found in the current frame. In a mean-shift iteration, the center of the target is translated by the mean shift vector, which is an estimate of the normalized density gradient. The statistical distance is computed after the translation, and a new mean shift vector is applied, until the statistical distance is minimized or the centers of the distributions are separated by less than a minimum physical distance.

SUMMARY

In general, in one aspect, the invention relates to a method for tracking objects. The method includes identifying a target, identifying a plurality of auxiliary objects related to the target, and tracking the target using the plurality of auxiliary objects.

In general, in one aspect, the invention relates to a tracking system. The tracking system is configured to receive an image sequence, identify a target in the image sequence, identify a plurality of auxiliary objects related to the target, and track the target using the plurality of auxiliary objects.

In general, in one aspect, the invention relates to a computer usable medium having computer readable program code embodied therein for causing a computer system to execute a method for tracking objects. The computer usable medium includes identifying a target, identifying a plurality of auxiliary objects related to the target, and tracking the target using the plurality of auxiliary objects.

Other aspects and advantages of the invention will be apparent from the following description and the appended claims.

DETAILED DESCRIPTION

Figure 1A:
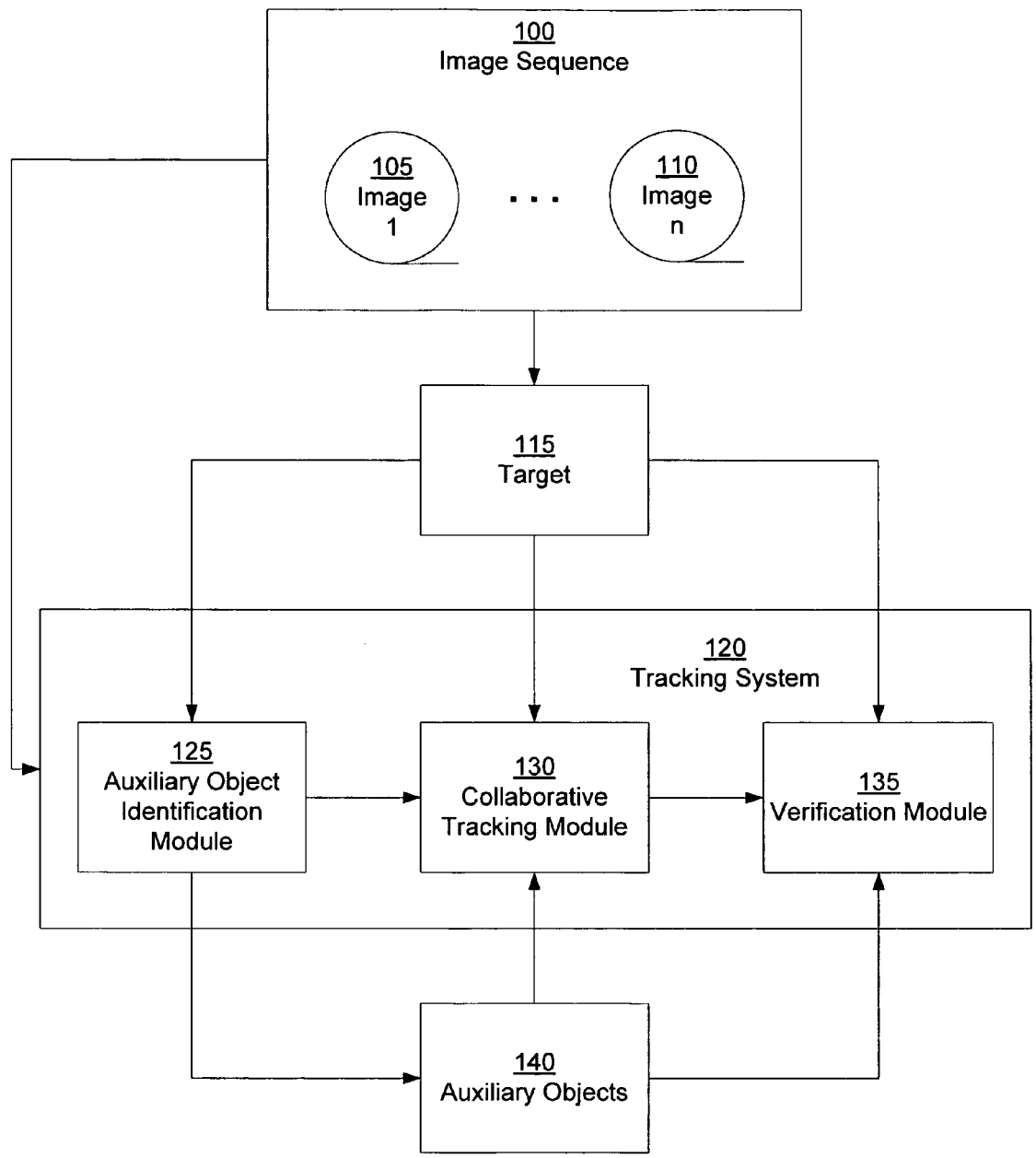
FIGS. 1A, 1B, and 2 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to track a target in an image sequence. The target may be specified on the fly and tracked in any environment without any prior training of the tracking system. Further, the image sequence is capable of handling real-world scenarios such as agile targets, out-of-plane rotation, cluttered background, multiple objects, clutter, illumination and view changes, occlusion, low image quality, and blur. Embodiments of the invention may be implemented on a digital camera or video camera for various purposes, such as surveillance and security, consumer use, sporting events, etc.

Specifically, embodiments of the invention provide a method and apparatus to track a moving target in a complex environment using auxiliary objects related to the target in the scene. The target is tracked collaboratively with the auxiliary objects such that data obtained from tracking the auxiliary objects is used to help track the target. Auxiliary objects may be found in various forms, such as solid semantic objects intrinsically related to the target, or image regions that have motion correlation with the target for a short period of time. Because auxiliary objects may correlate with the target at different times and exist over different periods, embodiments of the invention are able to identify and track auxiliary objects dynamically. In one or more embodiments of the invention, data mining techniques are used to discover auxiliary objects. In one or more embodiments of the invention, the target is identified as a person's head, and tracked using an elliptical tracking model with robust edge matching along the ellipse and verification of movement using a frame difference image. In one or more embodiments of the invention, multiple targets are tracked in the same image sequence; each target is associated with a set of auxiliary objects, and no two targets share the same auxiliary objects.

FIG. 1A shows a schematic diagram of a collaborative tracking system in accordance with one or more embodiments of the invention. As shown in FIG. 1A, the system includes an image sequence (100), a target (115), a tracking system (120), and a set of auxiliary objects (140). Each of these components is described below.

The target (115) is specified and tracked within an image sequence (100), which contains multiple images (e.g., image 1 (105), image n (110)) and depicts a moving scene. The image sequence (100) depicts a series of motions by the target (115) and auxiliary objects (140). The image sequence (100) may be any sort of digital video format, including MPEG, AVI, DVD, and QuickTime™ (QuickTime™ is a registered trademark of Apple Computer, Inc.). In addition, the image sequence (100) may be stored in an analog format and converted to a digital format for tracking. In one or more embodiments of the invention, each image (e.g., image 1 (105), image n (110)) in the image sequence (100) is converted into a two-dimensional array of pixel values so that objects can be characterized and tracked using image processing and statistical methods. Embodiments of the invention are configured to collaboratively track the target (115) and auxiliary objects (140) across the images (e.g., image 1 (105), image n (110)) in the image sequence (100).

The target (115) may be any object found in the image sequence (100). For example, the target (115) may be a person's face or other body part, a fighter jet, a car, or a dog. The target (115) may be depicted in any scene in the image sequence (100). For example, a target (115) may be a person's face; the person may be part of an airport surveillance tape, a home video, or a Hollywood movie. The target (115) may be specified at the first frame of the image sequence (100), at a sample frame chosen among the images (e.g., image 1 (105), image n (110)) in the image sequence (100), or characterized outside of the image sequence (100). For example, the target (115) may be tagged in a frame by selecting a region within the image; the region may be rectangular, elliptical, or an arbitrarily-defined shape. Alternatively, the target (115) may be specified outside of the image sequence (100). For example, if the target (115) is a person's face, an image or distribution of the face may be provided separately from the image sequence (100). The tracking system (120) will then extract the characteristics of the target (115) and attempt to locate the target (115) within the image sequence (100). Furthermore, the target (115) may be detected dynamically if enough information is known about the type of object that would constitute a target. For example, if the target is specified as a car, a search for car-like objects may identify one or more target cars on the fly.

Continuing with FIG. 1A, the tracking system (120) further includes an auxiliary object identification module (125), a collaborative tracking module (130), and a verification module (135). The auxiliary object identification module (125) receives the target (115) and image sequence (100) and identifies a set of auxiliary objects (140) to help with tracking the target (115) with. In one or more embodiments of the invention, data mining techniques are used in the auxiliary object identification module (125) to find the auxiliary objects (140). Further, in one or more embodiments of the invention, auxiliary objects (140) contain three properties: frequent co-occurrence with the target (115), consistent motion correlation with the target (115), and suitability for tracking. These three properties may be represented as values obtained by applying formulas, or by using heuristics. For example, co-occurrence with the target and consistent motion correlation with the target may be stored as variables with values that are updated with each frame. Tracking suitability may be a list of heuristics; for example, there may be size, shape, and color limitations on what can and cannot be tracked. Auxiliary objects (140) are characterized by an average color histogram and motion parameters and covariances with the target (115) in accordance with one or more embodiments of the invention. As stated above, auxiliary objects (140) are discovered on the fly and applied to tracking the target (115) as long as the three auxiliary object properties are satisfied.

The collaborative tracking module (130) receives the target (115) and image sequence (100), as well as the auxiliary objects (140) identified by the auxiliary object identification module (125). In one or more embodiments of the invention, the target (115) and auxiliary objects (140) are then tracked using the collaborative tracking module (130) by computing motion correlations between the target (115) and auxiliary objects (140). In one or more embodiments of the invention, the target (115) and auxiliary objects (140) are independently tracked; their motion correlations are then passed to the individual trackers (not shown) and used to track each object (e.g., target (115), auxiliary objects (140)). In one or more embodiments of the invention, belief propagation techniques are used in the collaborative tracking module (130) to track the target (115) and auxiliary objects (140). In addition, in one or more embodiments of the invention, relationships between the target (115) and auxiliary objects (140) are modeled using a star topology Markov random field.

The verification module (135) is used to verify the consistency of the correlations between the target (115) and auxiliary objects (140). In one or more embodiments of the invention, the verification module (135) uses robust fusion techniques to identify statistical outliers among the target (115) and auxiliary objects (140). If an outlier is found in the auxiliary objects (140), the auxiliary object is removed from tracking. If the target (115) is found to be an outlier, the auxiliary object identification process is temporarily stopped; collaborative tracking is performed again, and if the majority of objects are found to be outliers, a tracking failure is asserted.

Figure 1B:
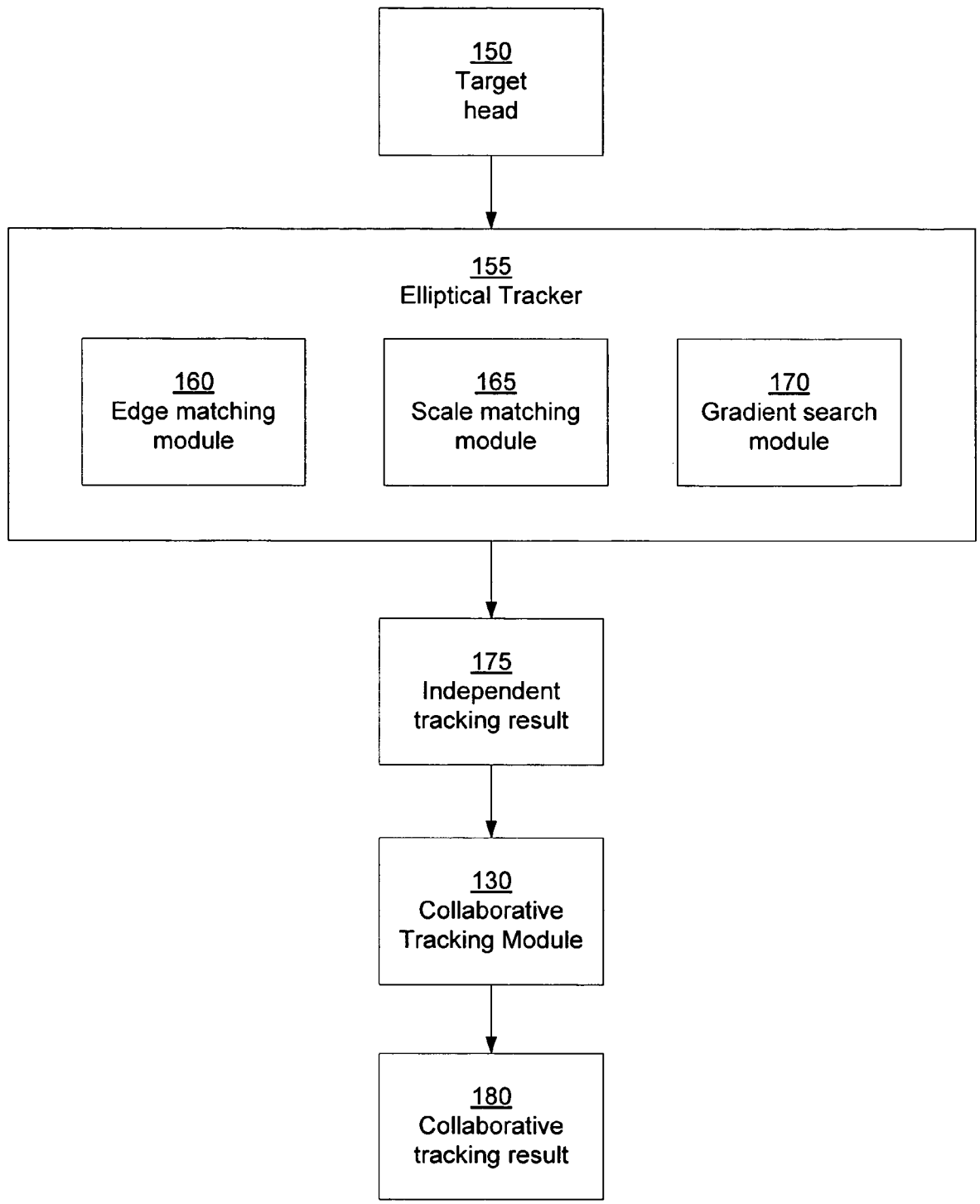

FIG. 1B shows a head tracking system in accordance with one or more embodiments of the invention. Specifically, FIG. 1B shows an exemplary embodiment of the invention for independently tracking a target head using an elliptical model. The independent tracking result is incorporated into the collaborative tracking system of FIG. 1A to determine a collaborative tracking result for the target head. As shown in FIG. 1B, the head tracking system includes a target head (150), an elliptical tracker (155), and an independent tracking result (175).

As implied by its name, the target head (150) represents a person's head. The target head (150) is found in an image sequence, or video; as stated above, the target head (150) may be specified at the first frame of the image sequence, at a sample frame of the image sequence, or characterized elsewhere. In one or more embodiments of the invention, the target head (150) can also be detected on the fly using an Adaboost frontal face detection algorithm. As the image sequence progresses, the target head (150) is tracked using the elliptical tracker (155). Target heads (150) may contain different facial features, bone structure, and hair style, as well as ornamentation such as hats and scarves, and image sequences may depict the target heads (150) in various environments.

The elliptical tracker (155) is responsible for tracking the target head (150) across the image sequence regardless of initial position and orientation, as well as subsequent rotations, translations, and scalings as the target head (150) moves through the image sequence. In one or more embodiments of the invention, the target head (150) is modeled as an ellipse with aspect ratio 1.25; the elliptical tracker (155) tracks the target head (150) by finding the ellipse in each frame. As shown in FIG. 1B, the elliptical tracker (155) includes an edge matching module (160), a scale matching module (165), and a gradient search module (170).

The edge matching module (160) is responsible for matching the contour of the target head (150) with the shape of the ellipse. In one or more embodiments of the invention, this contour matching is accomplished by detecting the edge responses $v_i$ of 36 evenly spaced points on the ellipse with Sobel edge detectors, then computing the sine of the angles $\theta_i$ between these edge responses with the normal vectors of the ellipse at each point to determine how closely the edges of the image region match those of an ellipse. For each point i, a matching score $m_i$ is obtained, and an overall matching score m calculated using the following formulas:

$$m = \frac{1}{36}\sum_{i=1}^{36} m_i, \quad m_i = \begin{cases} 1 - \sin\theta_i & |\vec{v_i}| \geq t_v, \theta_i \leq t_\theta \\ 0 & \text{otherwise} \end{cases}$$

The thresholds $t_v$ and $t_\theta$ indicate the minimum magnitude of the edge response and the maximum angle between the edge response and normal vector, respectively. In one or more embodiments of the invention, if the edge response of a point does not meet these thresholds for magnitude or angle, pixels along the normal vector of the ellipse at that point are examined for the best fit. In one or more embodiments of the invention, if m exceeds a certain threshold (e.g. 0.26), then an appropriate ellipse is detected. Those skilled in the art will appreciate that the above thresholds and numbers of points can be adjusted to optimize the tracking algorithm for various situations.

The scale matching module (165) is used to fit the target head (150) to the best-sized ellipse. In one or more embodiments of the invention, five different scales of 0.9, 1, 1.1, 1.2, and 1.5 times the previous ellipse size are applied to the target head (150). The scale with the best overall matching score is used to track the target head (150). Those skilled in the art will appreciate that different numbers and sizes of scales may be used to fit the target head (150) to the ellipse.

The gradient search module (170) is used to detect the target head (150) in subsequent frames of the image sequence. In one or more embodiments of the invention, the gradient search module (170) uses a diamond search pattern of 25 points around the target head (150) in the previous image to find the target head in the next image. When a gradient is found within 25 points of the previous target head (150) arranged in a diamond pattern, the center of the search pattern is moved to that gradient and the ellipse modeled around the found gradient.

Once processing is done on an image, an independent tracking result (175) is outputted by the elliptical tracker (155). In one or more embodiments of the invention, the independent tracking result (175) is represented as an ellipse or rectangle around the target head (150). Alternatively, the independent tracking result (175) may be represented by coordinate locations with a mean and a variance. The independent tracking result (175) is passed to the collaborative tracking module (130) described in FIG. 1A. The collaborative tracking module (130) then outputs a collaborative tracking result (180) of the target head's (150) position based on the independent tracking result (175) and data obtained from the auxiliary objects of FIG. 1A.

Figure 2:
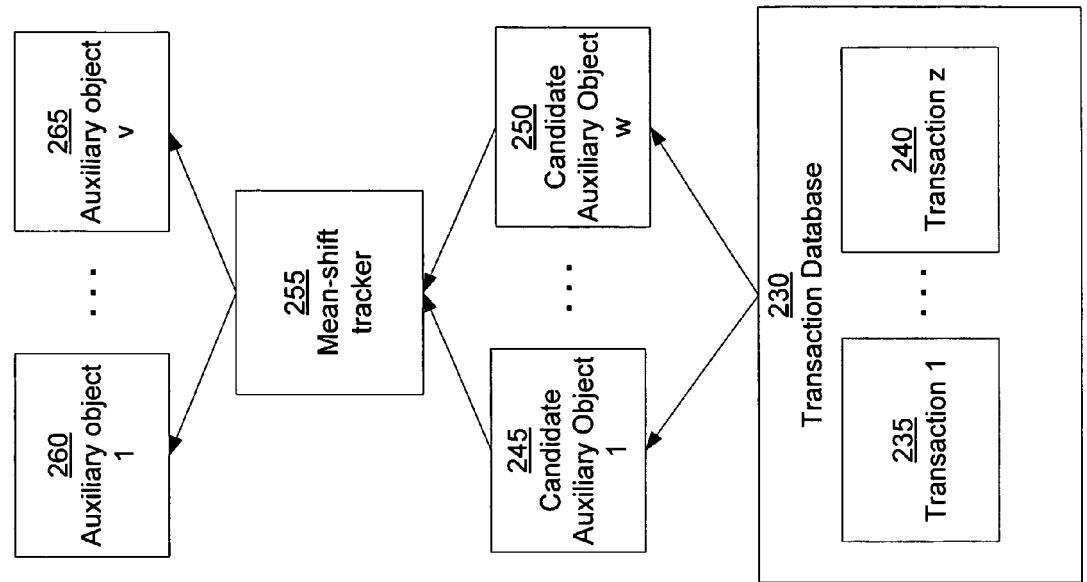
Figure 2:
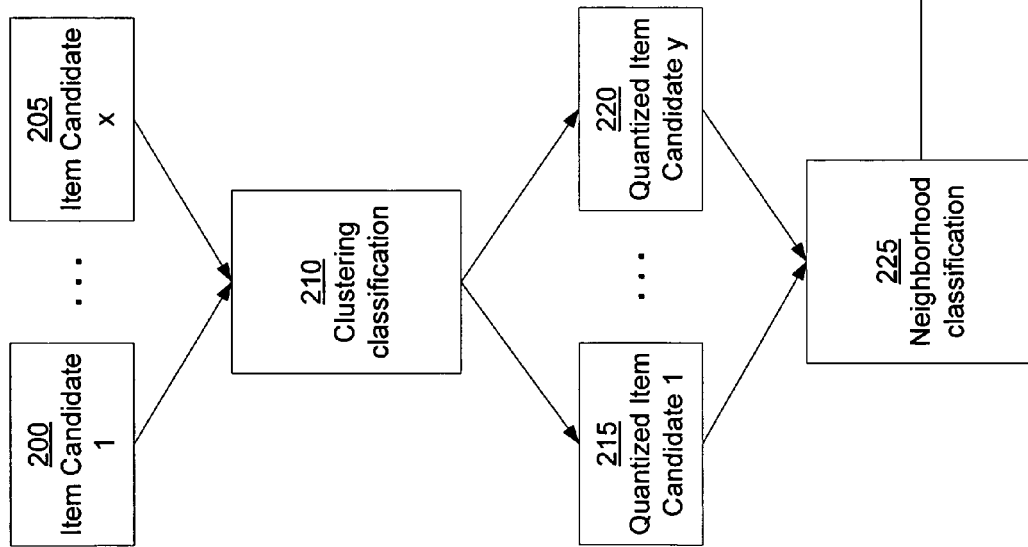

FIG. 2 shows a system for data mining auxiliary objects in accordance with one or more embodiments of the invention. In one or more embodiments of the invention, the system of FIG. 2 corresponds to the auxiliary object identification module of FIG. 1A. As shown in FIG. 2, the system includes a plurality of item candidates (e.g. item candidate 1 (200), item candidate x (205)), a clustering classification (210), a plurality of quantized item candidates (e.g. quantized item candidate 1 (215), quantized item candidate y (220)), a neighborhood classification (225), a transaction database (230), a plurality of candidate auxiliary objects (e.g. candidate auxiliary object 1 (245), candidate auxiliary object w (250)), a mean shift tracker (255), and a plurality of auxiliary objects (e.g. auxiliary object 1 (260), auxiliary object v (265)). In one or more embodiments of the invention, data mining of auxiliary objects begins with the first frame of the image sequence and continues in real time as the frames are displayed.

In one or more embodiments of the invention, item candidates (e.g. item candidate 1 (200), item candidate x (205)) are parts of the image that are simple, generic, and low-level. For example, an item candidate may be an image region obtained through the split-merge quad-tree color segmentation algorithm, where an image is first recursively split into the smallest possible homogenous rectangular color regions. Alternatively, if computational complexity is not an issue, item candidates may be discovered by extracting invariant features within the image and forming feature points.

After the image is split, adjacent regions with similar appearances are merged gradually to create item candidates (e.g. item candidate 1 (200), item candidate x (205)). In one or more embodiments of the invention, an item candidate (e.g. item candidate 1 (200), item candidate x (205)) is defined by its average color histogram, motion parameters and respective covariances with the target. In one or more embodiments of the invention, heuristics are used to prune segments that are not appropriate for tracking from consideration as item candidates (e.g. item candidate 1 (200), item candidate x (205)). For example, segments that take up more than half of the image, contain fewer than 64 pixels, or make up less than half the area of the bounding box are excluded from consideration. In one or more embodiments of the invention, item candidates (e.g. item candidate 1 (200), item candidate x (205)) serve as inputs for data mining auxiliary objects.

Once the set of item candidates (e.g. item candidate 1 (200), item candidate x (205)) are found, they are passed through a clustering classification (210), which forms a set of quantized item candidates (e.g. quantized item candidate 1 (215), quantized item candidate y (220)). In one or more embodiments of the invention, the clustering classification (210) forms quantized item candidates (e.g. quantized item candidate 1 (215), quantized item candidate y (220)) from item candidates (e.g. item candidate 1 (200), item candidate x (205)) by determining the Bhattacharyya coefficient between the color histograms of the item candidates (e.g. item candidate 1 (200), item candidate x (205)), then applying k-means clustering to the item candidates using the Bhattacharyya coefficients as indicators of distance. Clusters formed by the k-means clustering become quantized item candidates (e.g. quantized item candidate 1 (215), quantized item candidate y (220)). Those skilled in the art will appreciate that based on the clustering algorithm and specifications, different numbers of quantized item candidates (e.g. quantized item candidate 1 (215), quantized item candidate y (220)) may be created by the clustering classification (210). In addition, those skilled in the art will appreciate that a given number of item candidates (e.g. item candidate 1 (200), item candidate x (205)) may yield a different number of quantized item candidates (e.g. quantized item candidate 1 (215), quantized item candidate y (220)).

Once the set of quantized item candidates is created (e.g. quantized item candidate 1 (215), quantized item candidate y (220)) from the clustering classification (210), the quantized item candidates are passed to a neighborhood classification (225). In one or more embodiments of the invention, quantized item candidates (e.g. quantized item candidate 1 (215), quantized item candidate y (220)) are grouped in the neighborhood classification (225) according to physical proximity to form transactions (e.g. transaction 1 (235), transaction z (240)), which form the transaction database (230). For example, the neighborhood classification (225) may compute the pixel values of the center of each quantized item candidate (e.g. quantized item candidate 1 (215), quantized item candidate y (220)), then group the quantized item candidates (e.g. quantized item candidate 1 (215), quantized item candidate y (220)) into transactions (e.g. transaction 1 (235), transaction z (240)) based on the proximity of the center pixel values to one another. Those skilled in the art will appreciate that different numbers of transactions (e.g. transaction 1 (235), transaction z (240)) containing different quantized item candidates (e.g. quantized item candidate 1 (215), quantized item candidate y (220)) may be created by the neighborhood classification (225), depending on how the quantized item candidates (e.g. quantized item candidate 1 (215), quantized item candidate y (220)) are classified.

The set of transactions (e.g. transaction 1 (235), transaction z (240)), where each transaction in the set is a set of quantized item candidates (e.g. quantized item candidate 1 (215), quantized item candidate y (220)), form a transaction database (230). In other words, the transaction database (230) is a set of sets of quantized item candidates that are spatially adjacent to one another. For example, if three transactions $t_1$, $t_2$, and $t_3$ contained the quantized item candidates $\{q_1, q_3, q_4\}$, $\{q_5, q_9, q_{10}\}$, and $\{q_6, q_8\}$, a transaction database containing the three transactions could be denoted $\{t_1, t_2, t_3\}$ or $\{\{q_1, q_3, q_4\}, \{q_5, q_9, q_{10}\}, \{q_6, q_8\}\}$.

Once the transaction database (230) is built, a set of candidate auxiliary objects (e.g. candidate auxiliary object 1 (245), candidate auxiliary object w (250)) is selected from the transactions (e.g. transaction 1 (235), transaction z (240)). In one or more embodiments of the invention, a transaction (e.g. transaction 1 (235), transaction z (240)) that frequently exists concurrently with the target is selected as a candidate auxiliary object (e.g. candidate auxiliary object 1 (245), candidate auxiliary object w (250)). In one or more embodiments of the invention, candidate auxiliary objects (e.g. candidate auxiliary object 1 (245), candidate auxiliary object w (250)) are selected from the transaction database (230) using a frequent pattern growth (FP-growth) algorithm. The co-occurrent frequencies of the transactions (e.g. transaction 1 (235), transaction z (240)) with the target may be determined by maintaining a history of all previous frames in the image sequence and keeping track of how often each transaction (e.g. transaction 1 (235), transaction z (240)) can be found in the history. The FP-growth algorithm then prunes the transaction database (230) according to frequency until a specified criterion is reached. For example, transactions may be removed until the remaining transactions have at least a minimum co-occurrent frequency with the target, or there are only a certain number of transactions left. The remaining transactions (e.g. transaction 1 (235), transaction z (240)) then form the set of candidate auxiliary objects (e.g. candidate auxiliary object 1 (245), candidate auxiliary object w (250)).

Those skilled in the art will appreciate that candidate auxiliary objects (e.g. candidate auxiliary object 1 (245), candidate auxiliary object w (250)) may be made up of only image segments discovered during the segmentation process. Referring to FIG. 2, this may be done by setting the size of a quantized item candidate (e.g. quantized item candidate 1 (215), quantized item candidate y (220)) to only one item candidate (e.g. item candidate 1 (200), item candidate x (205)), and the size of a transaction (e.g. transaction 1 (235), transaction z (240)) to only one quantized item candidate (e.g. quantized item candidate 1 (215), quantized item candidate y (220)). Alternatively, image segments may be automatically designated transactions (e.g. transaction 1 (235), transaction z (240)) and the clustering classification (210) and neighborhood classification (225) skipped. In one or more embodiments of the invention, the composition of transactions (e.g. transaction 1 (235), transaction z (240)) is determined by the type of images found in the image sequence; if too many small segments are produced by segmentation, transactions (e.g. transaction 1 (235), transaction z (240)) are formed by grouping segments as described above. However, if image segmentation creates segments of a reasonable size and number, transactions (e.g. transaction 1 (235), transaction z (240)) can be formed directly from the segments. For example, if an image is made up of largely homogenous regions, the transaction database (230) can most likely be created from the image segments themselves and candidate auxiliary objects (e.g. candidate auxiliary object 1 (245), candidate auxiliary object w (250)) can be directly selected from the transaction database (230).

Once the candidate auxiliary objects (e.g. candidate auxiliary object 1 (245), candidate auxiliary object w (250)) are selected, they are checked for motion correlation with the target. In one or more embodiments of the invention, this tracking is performed by a mean shift tracker (255). The candidate auxiliary objects (e.g. candidate auxiliary object 1 (245), candidate auxiliary object w (250)) are mapped to probability distributions according to some attribute, such as color. The candidate auxiliary objects (e.g. candidate auxiliary object 1 (245), candidate auxiliary object w (250)) are tracked by locating their probability distributions in subsequent frames. Alternatively, a template tracker or optical floor method tracker may be used to track the candidate auxiliary objects (e.g. candidate auxiliary object 1 (245), candidate auxiliary object w (250)) if color regions are not used to identify the candidate auxiliary objects. In one or more embodiments of the invention, if the mean-shift tracker (255) cannot locate a candidate auxiliary object (e.g. candidate auxiliary object 1 (245), candidate auxiliary object w (250)) for more than a certain number of frames in a row, the candidate auxiliary object is removed from the tracking system. In one or more embodiments of the invention, if the candidate auxiliary object (e.g. candidate auxiliary object 1 (245), candidate auxiliary object w (250)) cannot be tracked for more than four frames in a row, the candidate auxiliary object is removed from consideration.

If a candidate auxiliary object (e.g. candidate auxiliary object 1 (245), candidate auxiliary object w (250)) can be continuously tracked for a period of time, a motion trajectory is calculated. The motion trajectory of a candidate auxiliary object (e.g. candidate auxiliary object 1 (245), candidate auxiliary object w (250)) may be determined by computing the motion vector of the object between one frame and the next frame. This motion vector may include only x and y dimensions, or more advanced processing may be done to compute motion in the z dimension (i.e., towards and away from the camera's line of sight).

The motion trajectory of each candidate auxiliary object (e.g. candidate auxiliary object 1 (245), candidate auxiliary object w (250)) can be correlated with the motion trajectory of the target. For example, this correlation may be done by computing the dot product of the target's motion vector with a candidate auxiliary object's motion vector. Alternatively, motion correlation can be determined by comparing the variance of the distance between an object and the target; an affine motion model can be calculated for each object and a fitting error determined. Those candidate auxiliary objects (e.g. candidate auxiliary object 1 (245), candidate auxiliary object w (250)) with low fitting error have high motion correlations with the target. Candidate auxiliary objects (e.g. candidate auxiliary object 1 (245), candidate auxiliary object w (250)) that have high motion correlations with the target become auxiliary objects (e.g. auxiliary object 1 (260), auxiliary object v (265)) and are used to track the target. Because auxiliary objects (e.g. auxiliary object 1 (260), auxiliary object v (265)) are discovered on the fly, data mining may be performed at the beginning of the image sequence, as well as at later points, to determine the auxiliary objects (e.g. auxiliary object 1 (260), auxiliary object v (265)) that are relevant to the target at any given point.

Figure 3:
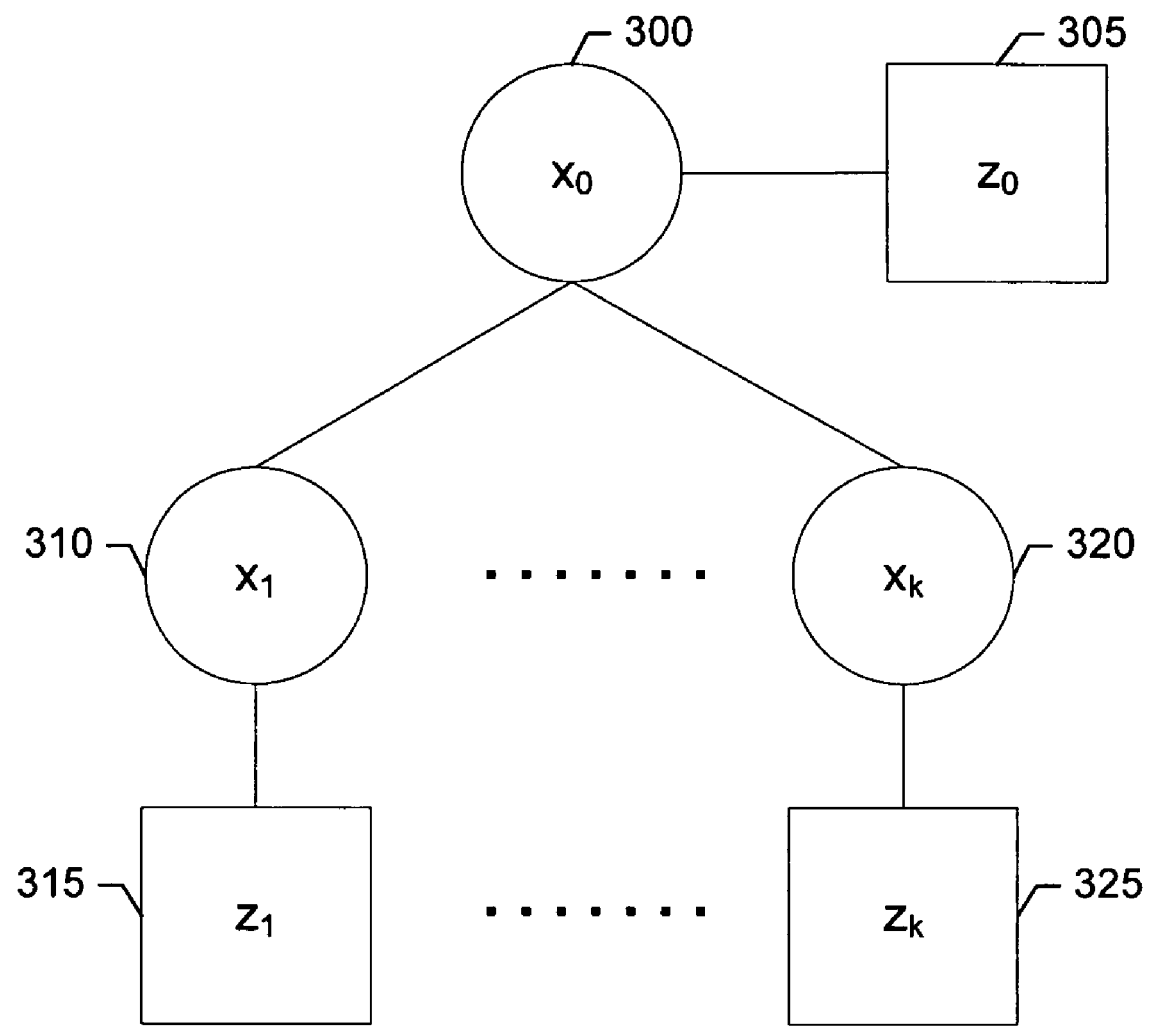
FIG. 3 shows a star topology Markov random field in accordance with one or more embodiments of the invention.

FIG. 3 shows a star topology Markov random field of the target and auxiliary objects in accordance with one or more embodiments of the invention. As shown in FIG. 3, the star topology Markov random field contains a hub or center $x_o$ (300), the image evidence of the hub $z_o$ (305), multiple spokes (e.g. $x_1$ (310), $x_k$ (320)), and image evidences of the spokes (e.g. $z_1$ (315), $z_k$ (325)). In one or more embodiments of the invention, the hub $x_o$ (300) is the target, and the spokes (e.g. $x_1$ (310), $x_k$ (320)) are the auxiliary objects. Their image evidences (e.g. $z_0$ (305), $z_1$ (315), $z_k$ (325)) are the pixel representations of the actual objects in the image sequence. In one or more embodiments of the invention, each object is tracked individually, and collaborative tracking is implemented by passing messages between objects.

Those skilled in the art will appreciate that the target and auxiliary objects form a random field; as a result, belief propagation techniques may be applied to the target and auxiliary objects in FIG. 3 to help track the target. For example, the pairwise potentials $\psi_{ko}(x_k, x_o)$ between the target and auxiliary objects may be calculated and used in belief propagation to track the objects with one another. In one or more embodiments of the invention, tracking of the objects in the image sequence with belief propagation techniques is performed in the collaborative tracking module of FIG. 1A. Further, in one or more embodiments of the invention, the structure of FIG. 3 is also used to verify the consistency of the target and auxiliary objects using robust fusion techniques in the verification module of FIG. 1A.

Figure 4:
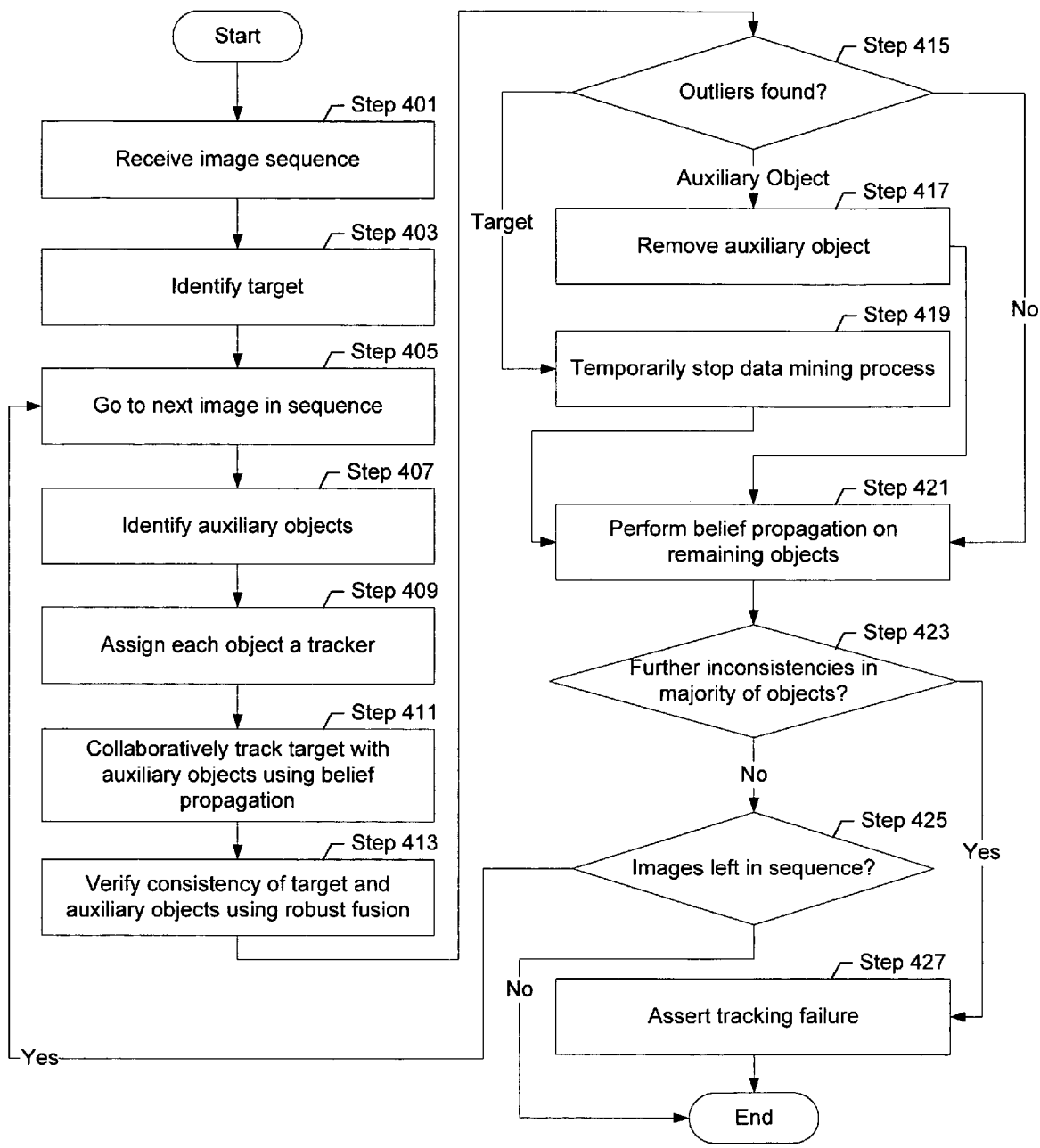
FIGS. 4-7 show flow diagrams in accordance with one or more embodiments of the invention.

FIG. 4 shows a flow diagram of target tracking in an image sequence in accordance with one or more embodiments of the invention. Specifically, FIG. 4 outlines how a target and auxiliary objects are identified and tracked in an image sequence, or video. First, an image sequence is received (Step 401) and a target is identified within the image sequence (Step 403). As stated above, the target may be identified by designating a region of the image containing the target, or by specifying the target separately using a set of attributes. Once the target is identified, the next image in the image sequence is examined (Step 405).

The auxiliary objects in the scene are identified by iterating through frames in the image sequence (Step 407). In one or more embodiments of the invention, auxiliary objects may be found using data mining techniques as described in FIG. 2. Once a set of auxiliary objects containing strong co-occurrence and motion correlations with the target is created, each object in the scene is assigned an individual tracker (Step 409). In one or more embodiments of the invention, each object is tracked using a mean-shift tracker. Those skilled in the art will appreciate that other tracking algorithms may be used to track objects in the scene, and the tracking algorithm for the target may be different from the tracking algorithm for the auxiliary objects.

Once a tracker is created for each object, the target and auxiliary objects are tracked collaboratively using belief propagation techniques (Step 411). In one or more embodiments of the invention, the star topology Markov random field of FIG. 3 is used in the belief propagation techniques. Messages are passed back and forth between the target and the auxiliary objects and used in the tracking algorithms to reduce uncertainties in the motion estimates of the objects.

While the objects in the scene are tracked, the consistency of the objects is also verified (Step 413). In one or more embodiments of the invention, verification is performed using robust fusion techniques, which attempt to find outliers in a set of data points. Verification is performed on the target and auxiliary objects to determine if any objects are outliers (Step 415); if no outliers are found, the collaborative tracking continues with belief propagation (Step 421).

If an auxiliary object is found to be an outlier, that auxiliary object is removed from tracking (Step 417). If the target is classified as an outlier, the auxiliary object data mining process is temporarily stopped (Step 419). In one or more embodiments of the invention, while the data mining process is paused, an estimate of the target's location can be obtained based on the predictions from the auxiliary objects; in addition, the image evidence of the target may be searched for in the image based on the properties of the target. The remaining objects are then tracked using belief propagation (Step 421) and checked for any more outliers (Step 423). If a majority of objects are classified as outliers, a tracking failure is asserted (Step 427) and an attempt is made to find the target within the image using the individual target tracker. Otherwise, a check is made to see if any images are left in the sequence (Step 425). If not, the tracking process is finished; if there are images left in the sequence, the tracking continues with the next image in the sequence (Step 405).

Figure 5:
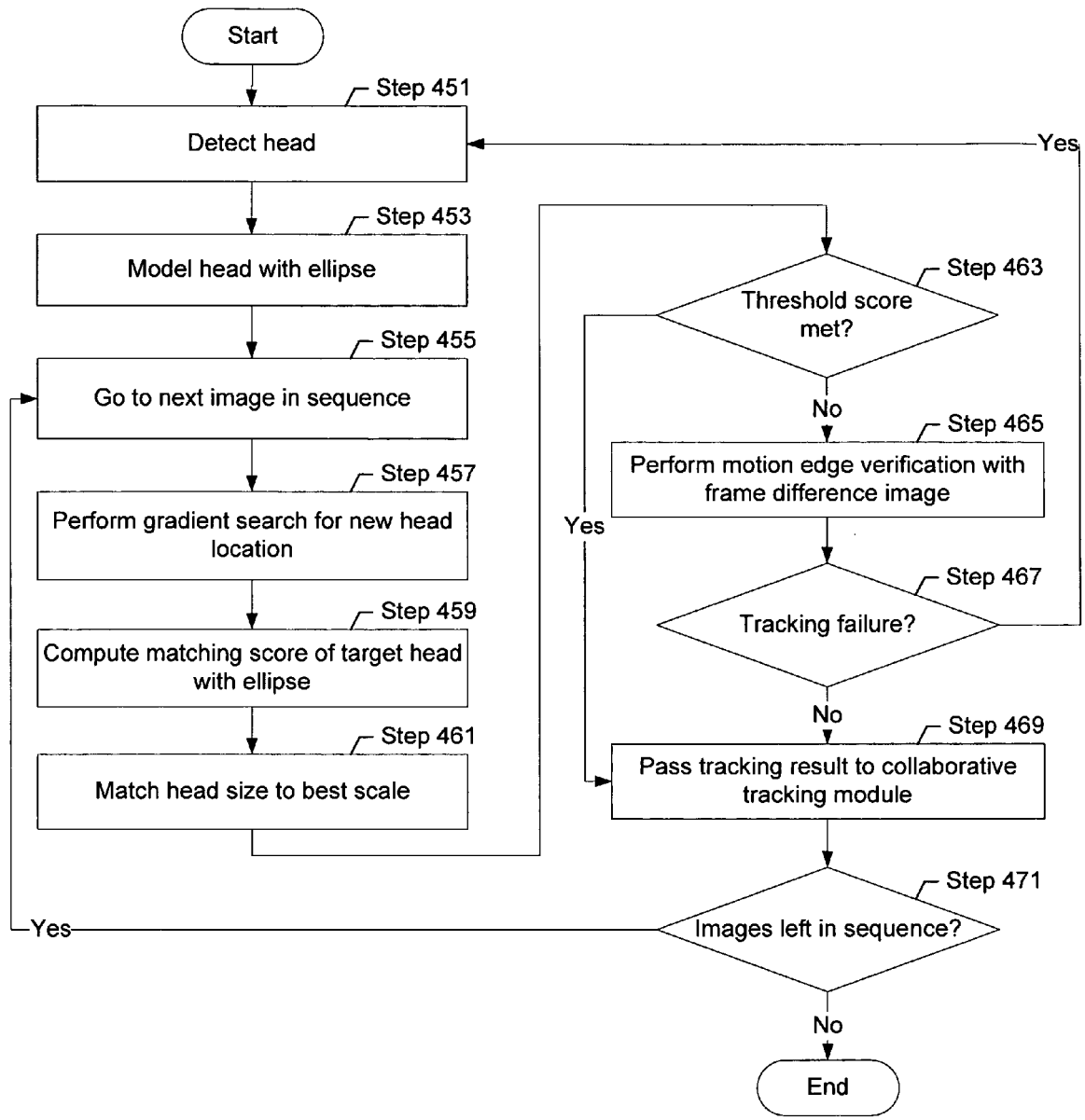

FIG. 5 shows a flow diagram of independent target tracking in accordance with one or more embodiments of the invention. Specifically, FIG. 5 shows the operation of an elliptical tracker on a target head in accordance with one or more embodiments of the invention. First, the head is detected (Step 451). As stated above, the head may be detected using one of several means, including automatic face detection, manual specification, or through an outside description. Next, the head is modeled with an ellipse (Step 453), which can be accomplished by the edge detection module in FIG. 1B. Once the head is initially modeled, the algorithm proceeds to the next frame in the image sequence (Step 455).

With each frame, gradient search is performed (Step 457) to find the new location of the target head. As described above, a gradient search may involve searching around a previous location of the target head using a 25-point diamond pattern. Other methods and search patterns may also be used to find the new target head location. For example, a square-shaped search pattern with a different number of points may be used.

Once the new target head location is found, the matching score of the possible target head with the ellipse is calculated (Step 459). This may be done using the method described above in FIG. 1B, or through another method. For example, a different number of points may be used to characterize the ellipse, and a different function apart from the sine function may be used to determine the relationship between the edge responses and normal vectors.

Next, the target head is matched with the best scale (Step 461). As stated above, this may be done by applying several different scales to the target head and selecting the scale with the highest matching score. Once adjustments based on location and scale are made, a determination is made to see if the threshold matching score is met or not (Step 463). If so, an appropriate match has been found and the result is passed to the collaborative tracking module (Step 469) so that the target can be collaboratively tracked with the auxiliary objects. If not, a frame difference image is obtained by subtracting one frame of the image sequence from the next frame and performing motion edge verification on the frame difference image (Step 465). In other words, a highest matching score is determined for the target head in the frame difference image; this matching score is then used to determine if a tracking failure has occurred (Step 467).

If the frame difference matching score exceeds another threshold matching score, which may or may not be the same as the threshold matching score for the original image, then a tracking failure has not occurred and the result of the frame difference calculation is passed to the collaborative tracking module (Step 469). Otherwise, the algorithm attempts to detect the head within the entire image (Step 451). In one or more embodiments of the invention, a tracking failure may also occur when the scale of the target head changes too much, or when the target head displacement exceeds a certain amount. Those skilled in the art will appreciate that the initial ellipse matching may involve the frame-difference image and motion edge verification performed with the original image; when the matching score threshold is not met for the frame difference image, the original image is used to verify the presence of the target head or to confirm a tracking error.

Once the tracking result is passed to the collaborative tracking module, a check is made to see if any images are left in the image sequence (Step 471). If so, the target is continually tracked in subsequent images (Step 455) until there are none left. Alternatively, a termination condition may exist to signal the end of tracking. For example, tracking may be stopped if a certain number of frames have been processed, the target has moved off the screen, etc.

Figure 6:
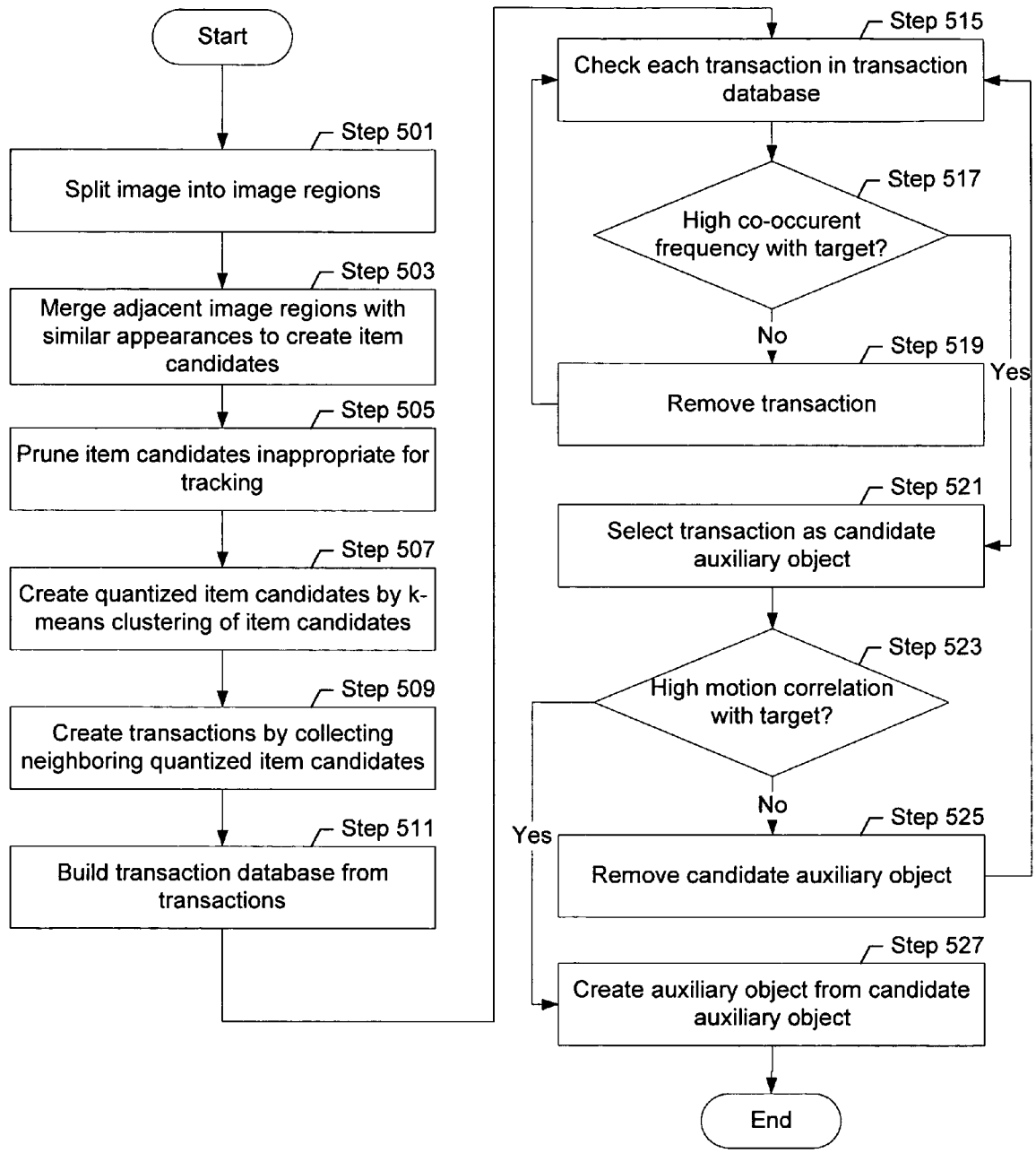

FIG. 6 shows a flow diagram of auxiliary object identification in accordance with one or more embodiments of the invention. Specifically, FIG. 6 shows a flow diagram of the data mining of auxiliary objects in an image sequence in accordance with one or more embodiments of the invention. Initially, the image is split into regions (Step 501). As stated above, image segmentation may be performed using a split-merge quad-tree color segmentation algorithm. Alternatively, a more sophisticated segmentation algorithm may be used to extract image regions if computational complexity is not an issue.

Once image regions have been identified, adjacent regions with similar appearances are merged to create item candidates (Step 503). Next, item candidates that are inappropriate for tracking are pruned (Step 505). As stated above, item candidates may be deemed inappropriate if they are too small, too large, shaped a certain way, etc. Once inappropriate segments are pruned, quantized item candidates are created by k-means clustering of the image regions (Step 507). Transactions are then created from the item candidates by grouping the quantized item candidates in the vicinity of one another (Step 509). The transactions are used to create the transaction database (Step 511).

Once the transaction database is created, each transaction in the transaction database is monitored (Step 515) and checked for a high co-occurrent frequency with the target (Step 517). If the transaction does not have a high co-occurrence with the target, the transaction is removed (Step 519). Otherwise, the transaction is selected as a candidate auxiliary object (Step 521). Next, each candidate auxiliary object is checked for a high motion correlation with the target (Step 523). If a high motion correlation is found, the candidate auxiliary object becomes an auxiliary object and is used in collaborative tracking with the target (Step 527). However, if after a certain number of frames the candidate auxiliary object displays little or no motion correlation with the target, the candidate auxiliary object is removed (Step 525).

Figure 7:
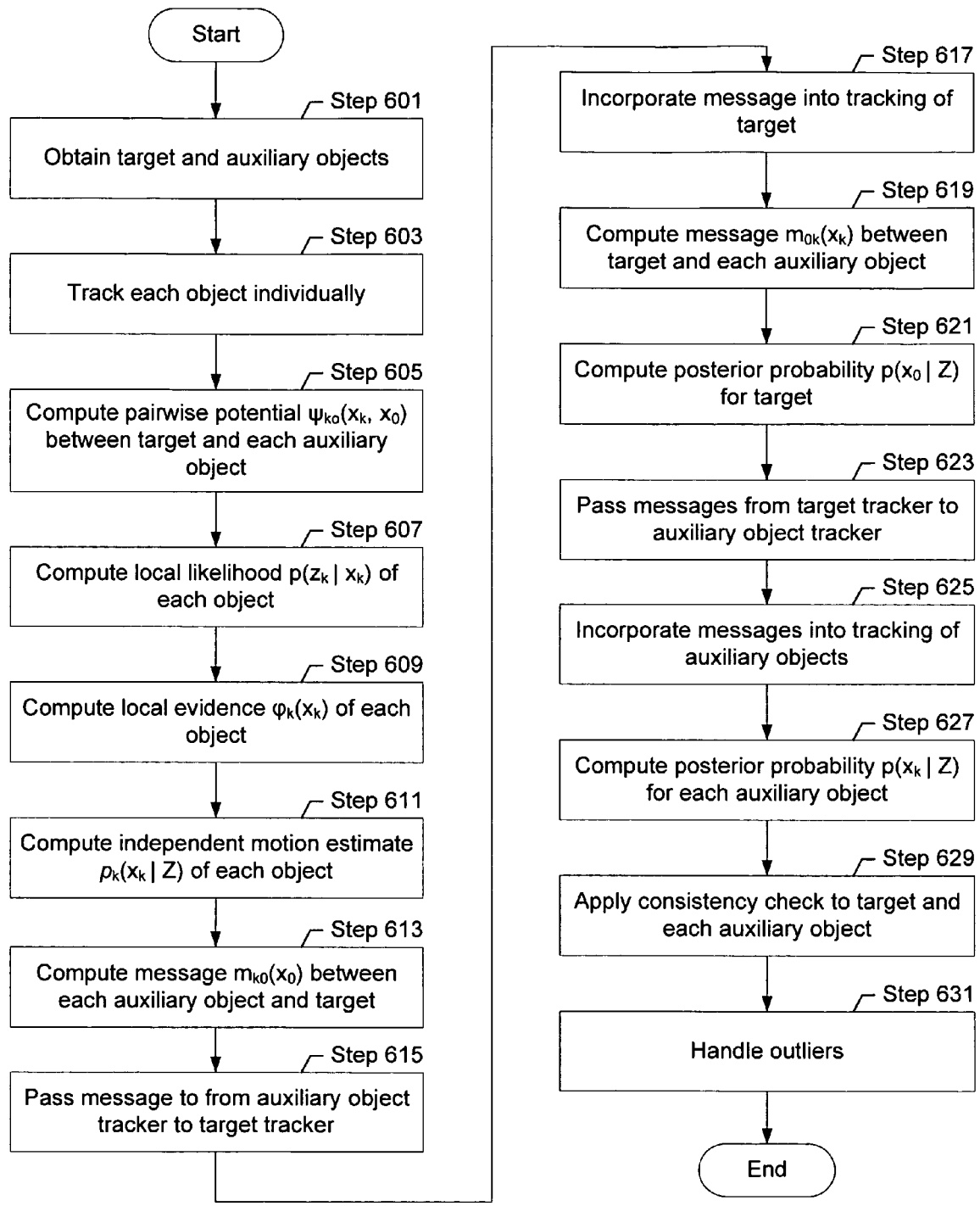

FIG. 7 shows a flow diagram of collaborative tracking and verification of objects in an image sequence in accordance with one or more embodiments of the invention. Specifically, FIG. 7 shows the use of belief propagation and robust fusion techniques to track and verify the consistency of the target and auxiliary objects in an image sequence. First, the target and auxiliary objects are obtained (Step 601). In one or more embodiments of the invention, the target is specified at the beginning of the image sequence, discovered dynamically, or described outside the image sequence, and the auxiliary objects are obtained through data mining techniques as described in FIG. 5. Once the objects in the image sequence are found, each object is individually tracked (Step 603).

As described above, in one or more embodiments of the invention, the target and auxiliary objects, as well as their image evidences, are modeled using a star topology Markov random field. Belief propagation techniques can then be applied to the star topology Markov random field to collaboratively track the target and auxiliary objects, and robust fusion techniques can be used to detect outliers among the tracked objects.

To collaboratively track the objects, the connections between the target and auxiliary objects are calculated and taken into account. First, the pairwise potential $\psi_{ko}(x_k, x_0)$ is computed between the target and each auxiliary object (Step 605). In one or more embodiments of the invention, the pairwise potential between the target and an auxiliary object is indicative of the statistical dependency between the two. In addition, the pairwise potential can be obtained from previous tracking results. Next, the local likelihood $p(z_k|x_k)$ is computed for each object (Step 607). In one or more embodiments of the invention, the local likelihood relates the statistical dependency between an object and its image evidence. In other words, the local likelihood is an estimate of the object's position from its tracker. In one or more embodiments of the invention, the pairwise potential and local likelihood are modeled as Gaussian distributions.

The local prior $\phi_k(x_k)$ is then estimated (Step 609). In one or more embodiments of the invention, the local prior is a predictor of the movement of an object. The independent motion estimates $p_k(x_k|Z)$ for each object are then computed as a function of the local prior and the local likelihood (Step 611). In one or more embodiments of the invention, this is accomplished using the independent trackers for the target and each auxiliary object. Next, the message $m_{ko}(x_0)$ between each auxiliary object and the target is computed as a function of the auxiliary object's independent motion estimate and the local likelihood between that auxiliary object and the target (Step 613). These messages are then passed to the target tracker (Step 615) and incorporated into the tracking of the target (Step 617) as described below.

Once the target tracker is updated with the messages from the auxiliary objects, messages $m_{0k}(x_k)$ between the target and each auxiliary object are computed (Step 619). In one or more embodiments of the invention, these messages are integral functions of the target's independent motion estimate and the messages passed to the target from the auxiliary objects. Next, the posterior probability $p(x_0|Z)$ of the target is computed as a function of the target's independent motion estimate and the messages passed to the target from the auxiliary objects (Step 621). In one or more embodiments of the invention, the posterior probability of the target is an estimate of the position of the target. In one or more embodiments of the invention, the posterior probability of the target is computed as the weighted average of the estimation of the target tracker and the predictions of the target's position from the auxiliary objects. In one or more embodiments of the invention, the weights are proportional to the reciprocals of the variances of each tracker as well as the variances of the relative positions of the auxiliary objects to the target. When the potentials and local likelihoods for the objects are Gaussian, the posterior probability of the target can be computed using the following formulas:

$$\sum\nolimits_{0}^{-1} = \hat{\sum}\nolimits_{0}^{-1} + \sum_{k=1}^{K}\left(\hat{\sum}\nolimits_{k} + \sum\nolimits_{k0}\right)^{-1}$$

$$\mu_0 = \sum\nolimits_{0}\left(\hat{\sum}\nolimits_{0}^{-1}\hat{\mu}_0 + \sum_{k=1}^{K}\left(\hat{\sum}\nolimits_{k} + \sum\nolimits_{k0}\right)^{-1}(\hat{\mu}_k + \mu_{k0})\right)$$

In the above formulas, $\Sigma_0$ and $\mu_0$ represent the variance and estimate of the target's position, $\hat{\Sigma}_0$ and $\hat{\mu}_0$ represent the variance and position estimates from the target's independent tracker, $\hat{\Sigma}_k$ and $\hat{\mu}_k$ represent the variance and estimates from each auxiliary object's independent tracker, and $\Sigma_{k0}$ and $\mu_{k0}$ represent the variance and position estimates for the target's position from each auxiliary object tracker. Those skilled in the art will appreciate that other formulas may be used to compute the target's position and variance, and that other kernels, such as the Epanechnikov kernel, may be used instead of the Gaussian.

The messages from the target to each auxiliary object are then passed to the auxiliary object trackers (Step 623), where they are incorporated into the tracking of the auxiliary objects (Step 625). The posterior probability $p(x_k|Z)$ of each auxiliary object is computed as a function of the auxiliary object's independent motion estimate, as well as the message passed to the auxiliary object from the target (Step 627). Next, robust fusion techniques are applied to the target and auxiliary objects to identify any outliers (Step 629). In one or more embodiments of the invention, the target and auxiliary objects can be characterized by Gaussian sources; the means and standard deviations of two objects can be applied to a robust fusion formula to determine if one is an outlier. In one or more embodiments of the invention, inconsistency between two objects can be determined by the following equations:

$$\frac{1}{n}(\mu_1 - \mu_2)^T\left(\sum\nolimits_{1} + \sum\nolimits_{2}\right)^{-1}(\mu_1 - \mu_2) \geq 2 + \sqrt{C_p} + \frac{1}{\sqrt{C_p}}$$

$$\frac{1}{n}(\mu_1 - \mu_2)^T\left(\sum\nolimits_{1} + \sum\nolimits_{2}\right)^{-1}(\mu_1 - \mu_2) < 4$$

where $\Sigma_1$ and $\mu_1$ and $\Sigma_2$ and $\mu_2$ represent the variances and means of two Gaussian sources, with $\mu 1, \mu 2 \epsilon R^n$, and $C_p$ is the 2-norm conditional number of $\Sigma_1 + \Sigma_2$. In one or more embodiments of the invention, the two sources are inconsistent if the first inequality is satisfied, and the two sources are consistent if the second inequality is satisfied. In one or more embodiments of the invention, an object that is inconsistent with a majority of other objects is classified as an outlier. Those skilled in the art will appreciate that other robust fusion formulas and methods may be applied to classify outliers among the target and auxiliary objects. After the consistency check is performed, the outliers are handled (Step 631) as described in FIG. 4.

Figure 8:
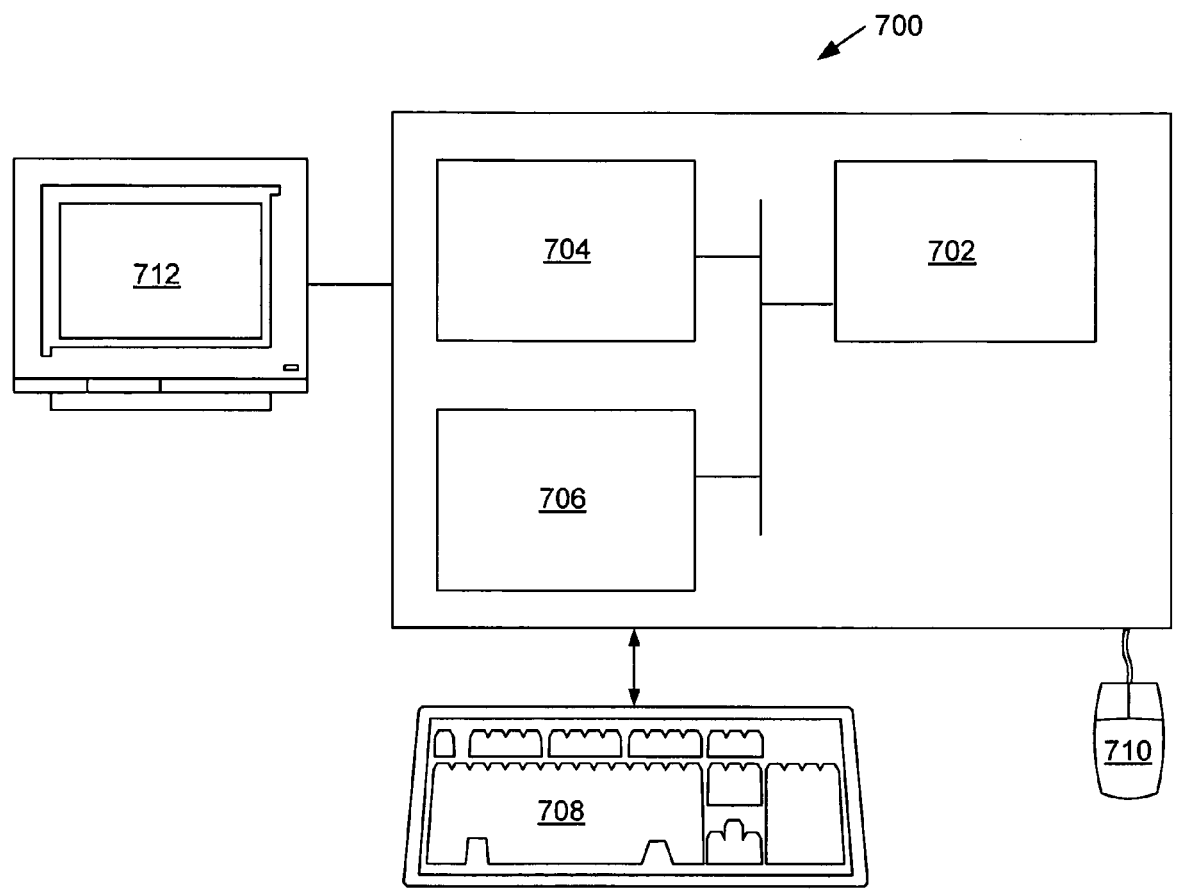
FIG. 8 shows a computer system in accordance with one or more embodiments of the invention.

The invention may be implemented on virtually any type of computer regardless of the platform being used. For example, as shown in FIG. 8, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, the invention may be implemented on a distributed system having a plurality of nodes, where each portion of the invention (e.g., image sequence, tracking system, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method for tracking objects, comprising:
 identifying a target;
 identifying a plurality of auxiliary objects related to the target; and
 tracking the target using the plurality of auxiliary objects, wherein a data mining technique is used to identify the plurality of auxiliary objects related to the target, the data mining technique further comprising:

using a frequent pattern growth (FP growth) technique to select a plurality of candidate auxiliary objects with high co-occurrent frequency with the target; and selecting the plurality of auxiliary objects from the plurality of candidate auxiliary objects, wherein each of the plurality of auxiliary objects maintains a high motion correlation with the target.

2. The method of claim 1, further comprising using a mean shift technique to:

track the plurality of candidate auxiliary objects; and determine motion correlations between the plurality of candidate auxiliary objects and the target.

3. The method of claim 2, wherein using the frequent pattern growth technique further comprises removing a candidate auxiliary object from the plurality of candidate auxiliary objects if the candidate auxiliary object cannot be tracked for a number of frames.

4. The method of claim 3, wherein the number of frames is four.

5. A tracking system configured to:

receive an image sequence;

identify a target in the image sequence;

identify a plurality of auxiliary objects related to the target; and track the target using the plurality of auxiliary objects, wherein a data mining technique is used to identify the plurality of auxiliary objects related to the target, the data mining technique further comprising:

using a frequent pattern growth (FP growth) technique to select a plurality of candidate auxiliary objects with high co-occurrent frequency with the target; and selecting the plurality of auxiliary objects from the plurality of candidate auxiliary objects, wherein each of the plurality of auxiliary objects maintains a high motion correlation with the target.

6. The tracking system of claim 5, further comprising using a mean shift technique to:

track the plurality of candidate auxiliary objects; and determine motion correlations between the plurality of candidate auxiliary objects and the target.

7. The tracking system of claim 6, wherein using the frequent pattern growth technique further comprises removing a candidate auxiliary object from the plurality of candidate auxiliary objects if the candidate auxiliary object cannot be tracked for a number of frames.

8. The tracking system of claim 6, wherein the number of frames is four.

* * * * *